March 18, 1952     D. M. MILLER     2,589,841
CORN SNAPPING ROLL CONSTRUCTION
Filed Sept. 23, 1948
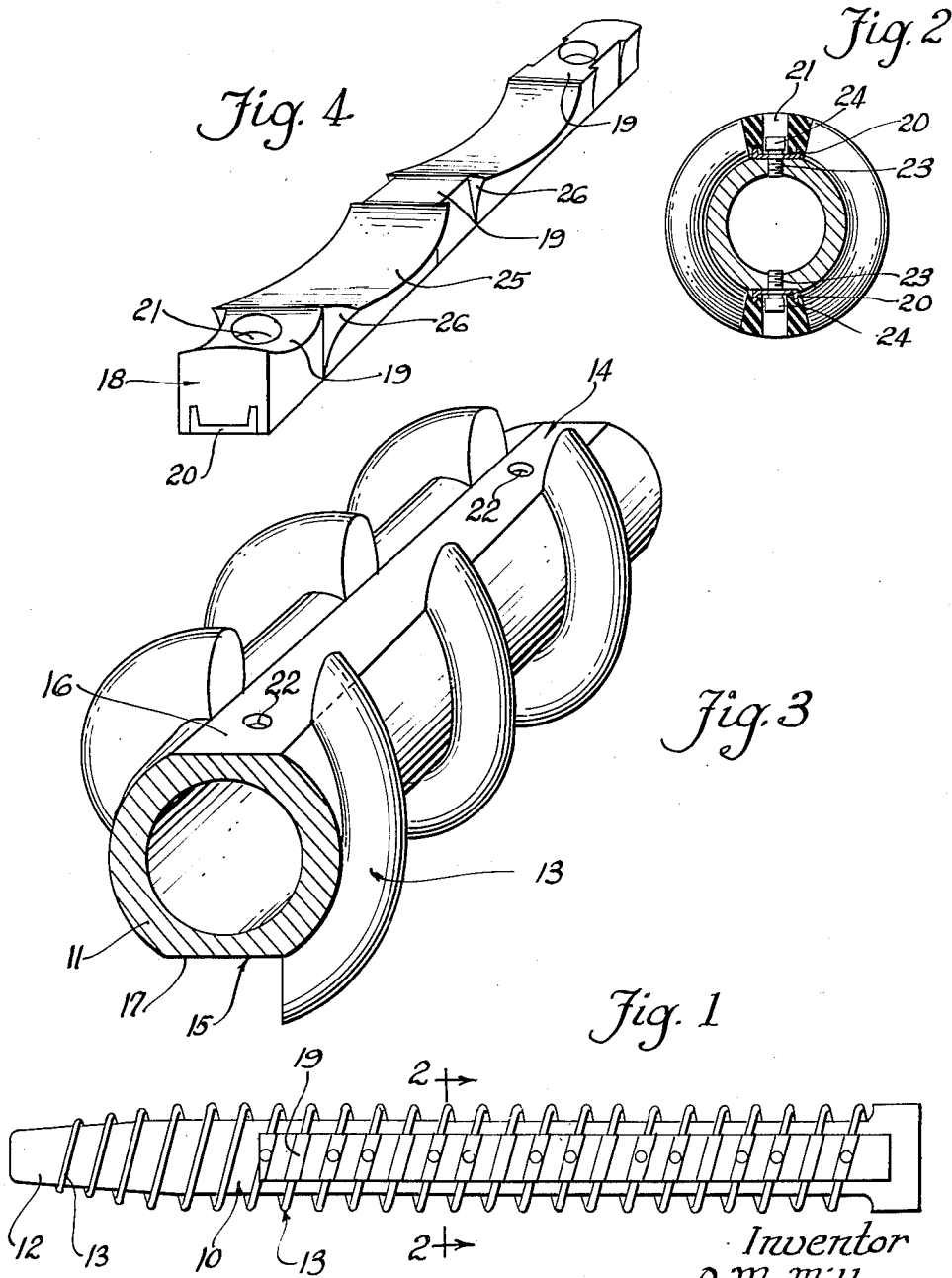

Patented Mar. 18, 1952

2,589,841

UNITED STATES PATENT OFFICE 2,589,841

CORN SNAPPING ROLL CONSTRUCTION

Delbert M. Miller, Davenport, Iowa, assignor to International Harvester Company, a corporation of New Jersey Application September 23, 1948, Serial No. 50,709

5 Claims. (Cl. 130—5)

This invention relates to a new and improved corn snapping roll construction.

There have been many types and shapes of corn snapping rolls manufactured. Certain of these rolls have had limited success. One roll will work efficiently in one type of corn whereas it is very inefficient in another type of corn. Rolls of combination materials have been tried and yet no one of these rolls has achieved successful corn snapping throughout a wide range of conditions. A corn snapping roll has as its primary function the job of snapping ears of corn from a corn stalk. A further and very important requirement of the corn snapping roll is that the ear of corn not be damaged during the snapping operation. The snapping roll must, therefore, be aggressive enough to force the stalk through to the point of ear attachment and thereupon snap the ear and yet not be too aggressive so that the stalk is broken and the ear not obtained at all or not so aggressive that the ear will lose a considerable portion of its kernels of corn at the time of snapping the ear from the stalk.

It is therefore an important object of this invention to provide a corn snapping roll constructed to efficiently snap ears of corn from their stalks.

Another important object of this invention is the provision of means in a corn snapping roll for providing longitudinally extending yieldable insert to forestall damage to the snapped ears in an otherwise aggressive steel roll.

A further important object of this invention is to provide a corn snapping roll having a continuous helical rib extending around and along the length of the roll and composed of intermittent steel and rubber portions.

A still further important object of this invention is to provide a spiral ribbed roll with longitudinally extending rectangular slots for the reception of longtudinally extending inserts of yieldable material and formed with longtudinally spaced ribs to complete a continuous spiral rib of alternate hard and yieldable material.

Another and still further important object of this invention is the provision of a corn snapping roll having a generally spiral rib integral around the surface thereof and including a rubber insert adapted to complete the spiral rib and to extend substantially above the surface of the roll between adjacent convolutions of the spiral ribs.

Other and further important objects of this invention will become apparent from the disclosures in the following specification and accompanying drawing.

In the drawing:

Fig. 1 is a top plan view of a corn snapping roll embodying the principles of this invention.

Fig. 2 is a sectional view taken on the line 2—2 of Fig. 1.

Fig. 3 is an enlarged detail perspective view of a portion of the snapping roll of this invention with the rubber insert removed.

Fig. 4 shows an enlarged perspective view detail of the insert adapted to be inserted within and fastened to the roll as shown in Fig. 3.

As shown in the drawings, the reference number 10 indicates generally a corn snapping roll having a generally cylindrical core 11 and a forwardly extending tapering point 12. A helical or spiral rib 13 is wound around and extends substantially the full length of the snapping roll 10. This rib 13 is integral with the core 11 either by forming with the core or by welding or otherwise fastening the rib to the core in the manufacture. The core 11 and the rib 13 are preferably made of steel or the like. Diametrically opposed radial, rectangular slots 14 and 15 are cut in the surface of the roll 10 to a depth slightly greater than the height of the rib 13 and forming flat surfaces 16 and 17 on the core 11. The rib 13 is now intermittent forming a substantially spiral path but having spaces at the point of the rectangular slots 14 and 15. An insert 18, as best shown in Fig. 4, is preferably made of a yieldable material such as rubber or synthetic rubber and is adapted to fill one of the rectangular slots 14 or 15 in the roll 10.

Longitudinally spaced ribs 19 are formed on the insert 18 and are arranged and constructed to become alined with the steel rib 13, thus forming a continuous spiral rib composed of alternate steel and rubber parts.

The rubber insert 18 is provided with a reinforcing channel member 20 to give it rigidity and supply the necessary foundation around which the rubber may be molded. Vertical holes 21 are provided at intervals along the length of the insert 18. Alined smaller holes are provided in the channel member 20 and the holes 21 are in further alinement with threaded apertures 22 along the flat portions 16 and 17 of the roll 10. Bolt members 23 are adapted to pass through the holes 21 in the rubber portion of the insert and enlarged heads 24 of the bolts 23 engage the upper side of the channel member 20 around the smaller diameter bolt apertures in the channel member 20. These bolts 23 can be drawn up tightly and hold the inserts 18 in fixed position on the core 11 of the roll 10.

The insert 18 is provided with a body portion 25 positioned between the longitudinally spaced ribs 19. This body portion permits use of a continuous strip insert and provides additional aggressiveness to the corn snapping roll. The top portion of the body portion or fill-in between the ribs 19 is concave forming a continuous curve from one rib to the next, and the sides of the body portion spread outwardly in a substantial fan shape or flabelliform as shown at 26. The vertical thickness of the portion 25 of the insert 18 is such that its extends considerably above the outer surface of the core 11 but beneath the outer diameter of the roll as defined by the spiral rib 13.

A corn snapping roll is usually used in conjunction with a cooperative snapping roll and the spiral ribs are for the purpose of advancing the stalk rearwardly between the cooperative rolls. Inasmuch as the rolls are inclined upwardly and rearwardly from a forward point on the machine the advancing of the stalk rearwardly between the rolls increases the distance between the ground-engaging root portion of the stalk and the level of the stalk at which the roll is engaging. Therefore, as the stalk moves rearwardly and hence downwardly within the cooperative snapping rolls the ear positioned at some height on the stalk arrives at the juncture between the cooperative rolls and its size prevents passage therethrough. The ear is then snapped from the stalk and the stalk continues its travel through the cooperative snapping rolls. The alternate steel and rubber spiral rib act to advance the stalk rearwardly between the rolls and the rubber body portion 25 of the insert 18 acts to force the stalk downwardly through the rolls. The inherent yieldability of the insert material prevents serious damage to the stalks and ears of corn, yet the rolls are aggressive enough to be efficient in their operation of snapping throughout a majority of the conditions encountered in corn to be snapped.

Many details of construction may be varied throughout a wide range without departing from the principles disclosed herein and I therefore do not propose limiting the patent granted hereon otherwise than as necessitated by the appended claims.

What is claimed is:

1. In a corn snapping roll comprising a cylindrical core, a helical rib integral with the core and extending therearound over the length thereof, said ribbed core having a rectangularly shaped radial slot extending along the length thereof and being greater in depth than the height of the rib whereby the rib is made intermittent, and a rectangular insert of yieldable material adapted to fit within the rectangular radial slot, said insert having longitudinally spaced ribs, each of said ribs being in alignment with the intermittent helical rib on the core to complete a continuous helical rib along the length of the roll.

2. In a corn snapping roll comprising a cylindrical core, a helical rib fixed to and around the core and extending substantially the length thereof, said ribbed core having diametrically opposed rectangular shaped radial slots extending along the length of the roll, said slots being greater in depth than the height of the rib whereby the roll core has flat surfaces at the bases of the slots and the helical rib is composed of spaced short portions, and rectangular inserts of yieldable material for said slots, said inserts having longitudinal spaced ribs adapted to align with the spaced short rib portions of the core forming a continuous rib and said inserts having body portions intermediate the spaced ribs, said body portions being concaved on their upper surfaces.

3. In a corn snapping roll comprising a substantially cylindrical core, an intermittent rib fixed to and forming a substantially spiral path around and along the length of the roll, said ribbed core having a regular rectangular radial slot in the outer surface thereof formed through the intermittent rib, and a rectangular insert of yieldable material adapted to fit within the rectangular slot, means for holding said insert within said slot, said insert formed with longitudinal spaced ribs in alignment with the intermittent rib on the roll core forming a continuous spiral rib over the length of the roll.

4. A device as set forth in claim 3 in which the insert is of sufficient thickness between the longitudinal spaced ribs to project above the core surface whereby the roll is an aggressive snapping roll.

5. A device as set forth in claim 3 in which the insert extends laterally in a fan shape beyond the width of the rectangular slot between the longitudinal spaced ribs.

DELBERT M. MILLER.

REFERENCES CITED

The following references are of record in the file of this patent:

UNITED STATES PATENTS

| Number | Name | Date |
| --- | --- | --- |
| 239,747 | Elliott | Apr. 5, 1881 |
| 613,249 | Creider | Nov. 1, 1898 |
| 1,830,772 | Stadtherr | Nov. 10, 1931 |
| 2,096,588 | King | Oct. 19, 1937 |
| 2,178,013 | Blank | Oct. 31, 1939 |
| 2,179,579 | Morrall et al. | Nov. 14, 1939 |
| 2,180,594 | Kuh'man | Nov. 21, 1939 |
| 2,308,102 | Paradise | Jan. 12, 1943 |
| 2,416,123 | Siemen | Feb. 18, 1947 |
| 2,469,687 | Fergason | May 10, 1949 |